(12) United States Patent
Lefort

(10) Patent No.: US 7,273,556 B2
(45) Date of Patent: Sep. 25, 2007

(54) METHOD FOR TREATING WATER CONTAINING MANGANESE

(75) Inventor: Frederic Lefort, Peronne (FR)

(73) Assignee: OTV S.A. (FR)

( * ) Notice: Subject to any disclaimer, the term of this patent is extended or adjusted under 35 U.S.C. 154(b) by 0 days.

(21) Appl. No.: 10/416,215

(22) PCT Filed: Nov. 6, 2001

(86) PCT No.: PCT/FR01/03441

§ 371 (c)(1),
(2), (4) Date: Sep. 11, 2003

(87) PCT Pub. No.: WO02/38511

PCT Pub. Date: May 16, 2002

(65) Prior Publication Data

US 2004/0035796 A1 Feb. 26, 2004

(30) Foreign Application Priority Data

Nov. 7, 2000 (FR) .................................. 00 14295

(51) Int. Cl.
*C02F 1/64* (2006.01)
*C02F 101/20* (2006.01)

(52) U.S. Cl. .................... 210/665; 210/668; 210/670; 210/673; 210/678; 210/722; 210/758; 210/763; 210/792; 210/794; 210/911; 210/912

(58) Field of Classification Search ................ 210/665, 210/668, 670, 678, 679, 688, 722, 724, 758, 210/792–795, 912, 911
See application file for complete search history.

(56) References Cited

U.S. PATENT DOCUMENTS

| 1,990,214 | A | * | 2/1935 | Zapffe ......................... 210/722 |
| 2,145,901 | A | | 2/1939 | Shoemaker ................. 252/176 |
| 2,355,808 | A | * | 8/1944 | Lawlor ........................ 427/215 |
| 3,506,125 | A | * | 4/1970 | Willis et al. ................. 210/776 |
| 3,623,978 | A | * | 11/1971 | Boze et al. .................. 210/732 |
| 4,226,740 | A | * | 10/1980 | Worsham et al. ......... 252/408.1 |
| 4,551,254 | A | | 11/1985 | Imada et al. ................. 210/688 |
| 5,082,570 | A | * | 1/1992 | Higgins et al. ............. 210/683 |
| 5,622,746 | A | * | 4/1997 | Hahn et al. .................... 427/79 |

FOREIGN PATENT DOCUMENTS

| GB | 471277 | 9/1937 |
| GB | 1361827 | 7/1974 |

* cited by examiner

*Primary Examiner*—Peter A. Hruskoci
(74) *Attorney, Agent, or Firm*—Coats & Bennett, P.L.L.C.

(57) ABSTRACT

The invention concerns a method for treating water for human consumption, so as to eliminate manganese and possibly other metals comprising steps which consist in: causing said water to pass at least over a bed of filtering material (3) consisting at least partly of manganese dioxide granules, said granules having a real density ranging between 3.5 and 4.5 and a hardness higher than 6 on the Mosh scale; regenerating, if necessary, said manganese dioxide, said regeneration being carried out mechanically.

26 Claims, 2 Drawing Sheets

METHOD FOR TREATING WATER CONTAINING MANGANESE

This application is a U.S. National Stage application of PCT Application No. PCT/FR01/03441, with an international filing date of Nov. 6, 2001. Applicant claims priority based on French application serial no. 00 14295 filed Nov. 7, 2000.

The present invention concerns a method for water treatment. More precisely, the invention concerns a method for making water intended for human consumption fit for drinking by removing manganese and optionally other metals such as ferrous iron.

The principle of manganese removal lies in its oxidation and the retaining on filters of the insoluble oxides so formed ($MnO_2$, $Mn_2O_3$). It not being possible in general to consider oxygen oxidation, the addition of strong oxidants is required to reach sufficient redox potentials. The most frequently used oxidant in this sphere is permanganate.

The conventional physicochemical process for demanganising water consists of chemically oxidizing the manganese contained in the water by means of potassium permanganate, chlorine or ozone, then filtering the water through a granular material such as sand for example. The latter may become coated with precipitates of manganese dioxide after several months forming what is known as natural "greensand". This "greensand" may also be prepared by previously depositing a film of hydrated manganese dioxide on the surface of a medium which may be sand, acid clay, anthracite, zeolite, a dolomite material, etc. The manganese dioxide is then considered as acting as catalyst.

This type of method has the major disadvantage of requiring the initial addition of a powerful oxidant such as potassium permanganate, free chlorine or ozone.

It will also be noted that in difficult cases the prior art suggested the direct use of manganese dioxide grains as filtering medium without the initial addition of an oxidizing agent.

However, in this case as in the others, regeneration of the filtering material is necessary using a strongly oxidizing compound either continuously or after stoppage of the system.

It will also be noted that with this type of method, manganese dioxide grains are of relatively small size, in the order of 0.3 to 0.7 mm. These manganese dioxide grains are used in the filter beds with sand. They are initially present on the surface of the filter bed, but on account of their small size, they gradually form a mixed bed with the sand likely to yield less efficacy over time.

The objective of the invention in particular is to remedy the disadvantages or deficiencies of the prior art.

More precisely, the objective of the invention is to put forward a physicochemical method for treating water with which it is possible to obtain efficient removal of the manganese contained in the water without the addition of a powerful oxidant.

Another objective of the invention is to provide such physicochemical method using a filtering material which does not necessitate chemical regeneration, in particular through the use of an oxidant.

The objective of the invention is also a method for treating water which generates little or no loss of filtering material.

A further objective of the invention is to propose just such a method using a filtering material derived for example directly from the mining industry only requiring simple mechanical treatment prior to its use.

Yet another objective of the invention is to provide just such a water treatment method which may be used with waters having variable, seasonable contents of dissolved manganese.

The invention also sets out to propose said method which is economical and easy to implement.

These objectives, and others which will become apparent in the remainder of the description, are achieved by means of a method of treating water to reduce its manganese content in particular and optionally its iron content, characterized in that it comprises the steps consisting of:

causing said water to transit through at least one bed of filtering material 3 formed at least in part of grains of manganese dioxide, said grains having an effective specific gravity of between 3.5 and 4.5 and having a hardness greater than 6 on the Mohs scale;

regenerating said manganese dioxide, whenever necessary, said regeneration being conducted mechanically.

The principle of the invention is therefore based on the use of manganese dioxide particles whose specific gravity and hardness can retain manganese without the addition of an oxidant, and without having to conduct chemical regeneration of the material using an oxidizing compound.

With said method it is possible to treat manganese-containing water with efficacy using manganese dioxide chosen for its characteristics and properties. The addition of a strong oxidant, such as potassium permanganate, free chlorine or ozone is not necessary, whether to reduce the manganese content of the water or to regenerate the filter material, contrary to usual practice.

The specific characteristics of specific gravity and hardness of the filter material chosen according to the invention make it possible to maintain a uniform, stable layer of manganese dioxide, unlike mixed beds of the prior art. More precisely, the hardness of the material, greater than 6 on the Mohs scale, allow for maintained initial particle size and initial adsorption capacity of this material. On this account, the consumption of manganese dioxide is negligible or even zero, which provides particularly advantageous results related to the fact that the material is not considered as a consumable.

According to one remarkable characteristic of the manganese dioxide chosen by the Applicant, it acts as a catalyst but also as oxidant. Its mode of action is therefore twofold.

The principle of its catalytic action is the same as the catalytic effect obtained with manganised sand ("greensand"), the material acting as adsorption medium for the manganese dissolved in the water.

Manganese dioxide has an oxidizing action by acting as oxidant vis-à-vis the dissolved manganese contained in the water to be treated.

It will also be noted that this manganese dioxide is not selective towards manganese, and also oxidizes ferrous iron, arsenic and selenium. The $Mn^{2+}$ and $Fe^{2+}$ ions are oxidized by $MnO_2$ and are deposited on the surface of the grains of the filtering medium.

The global redox reaction occurring on the surface of the material, at the solid-liquid interface, leads to the formation of manganese sesquioxide $Mn_2O_3$ (solid) both through the oxidation of the dissolved manganese and through reduction of the solid manganese dioxide. The $MN_2O_3$ so produced gradually coats the grains of material.

According to one embodiment of the invention, said regeneration step of said bed of filtering material is conducted periodically.

Such periodicity of the dioxide particle regenerating step may be conducted giving consideration in particular to the volumes of water to be treated and seasonal variations in their manganese content.

According to another embodiment, said regeneration step may also be conducted when said bed of filtering material reaches a predetermined load loss.

Continuous monitoring or monitoring by sampling of the residual manganese content in the water treated may indicate a load loss of the filtering material and lead to the decision to carry out a regeneration step.

In either case, the regeneration step makes it possible to maintain the efficacy of the method so as to obtain low residual manganese contents in the treated water.

According to a preferred embodiment of the invention, said regeneration step is made by simple washing, using a flow of water and/or gaseous fluid such as air.

This solution proves to be particularly simple and economical in relation to the prior art, which always requires the use of oxidizing compounds to regenerate the filtering material. Without the addition of a reagent, regeneration by washing according to the invention provides for progressive removal of the coating that is formed, so restoring the initial granules of $MnO_2$.

Advantageously, said washing is conducted in counter-flow direction relative to the direction of flow of the water to be treated within said filter bed.

Counter-flow regeneration relative to the flow of water to be treated gives particularly satisfactory results. However, a regeneration step using a washing fluid following the same direction of flow as the flow of water to be treated could easily be considered.

Therefore, according to another embodiment, said washing is conducted in the same direction of flow of the water to be treated within said filter bed.

Preferably, said filtering material contains at least 70% weight equivalent $MnO_2$.

Advantageously, the grains of manganese dioxide have an effective size of 0.8 to 1 mm and a uniformity coefficient of between 1.3 and 2.5. It is recalled that effective size is the size of a sieve opening which will pass 10% by weight of the media sample, and that the uniformity coefficient is the ratio between the sieve openings passing 60% and 10% respectively.

The particle size of manganese dioxide is determined by screening in accordance with the rules and techniques specified by standards in force.

According to one preferred solution, said grains of manganese dioxide are associated with at least one other material chosen from among the following materials:
  sand;
  anthracite;
  active carbon granules.

According to one advantageous solution, the method comprises a prior crushing and screening step of manganese dioxide with a view to obtaining a particle size suitable for the desired filtration.

Preferably, the method comprises an additional pH adjustment step of the said water by treatment with air, sodium hydroxide or lime water upstream from the filtering step.

According to one embodiment, said step consisting of causing said water to transit through at least one bed of filtering material is conducted under atmospheric pressure.

According to another embodiment, this step is conducted under pressure.

The method can therefore be implemented both using filters operating at atmospheric pressure and with filters operating under pressure.

Other characteristics and advantages of the invention will become more clearly apparent on reading the following description and two preferred embodiments of the invention given by way of illustrative, non-restrictive examples, and the appended drawings among which:

Figure 1:
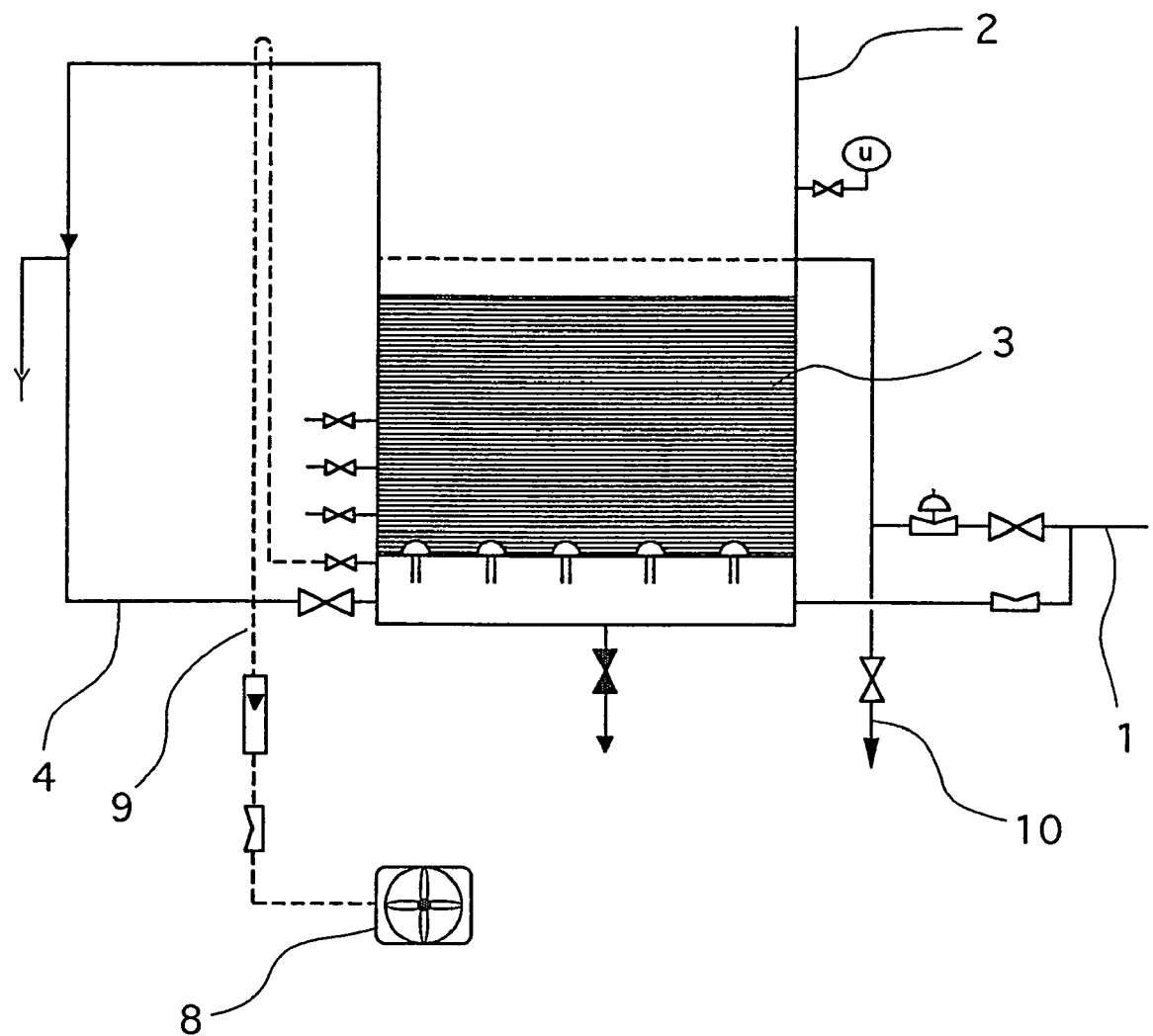
FIG. 1 illustrates an industrial manganese removal unit of the invention

In the industrial water treatment unit schematically shown in FIG. 1, the water is brought via a pipe 1 into filter 2 which, in the case illustrated, is open, that is to say under atmospheric pressure, but which may be of any other type in other embodiments.

The water to be treated is therefore brought and discharged over a filter bed 3 containing 70% by volume of manganese dioxide grains ($MnO_2$) and 30% sand.

The manganese dioxide used in bed 3 is derived from the mining industry and was obtained by simple crushing and screening (following standard ISO 2591-1) to obtain an effective size ranging from 0.8 to 1 mm with a uniformity coefficient of between 1.3 and 2.5.

According to the invention, the specific gravity of the manganese dioxide grains used is in the order of 4 and their hardness on the Mohs scale is greater than 6.

In the case of opening filtering such as shown in FIG. 1, the water flows under gravity through the filter bed 3 and is collected at the base of filter 2 by an outlet pipe 4 for the treated water.

Upstream from the filtering, the water undergoes a pH adjustment step whenever necessary by treatment with air. Such adjustment is performed if the pH of the water to be treated is less than 7.2.

In order to remove the coating of $Mn_2O_3$ formed during filtering around the grains in bed 3 and to restore the $MnO_2$ grains to their initial state, simple mechanical washing is conducted using a gaseous fluid, optionally air. It will be noted that according to one characteristic of the invention, and unlike the prior art, no addition of an oxidizing reagent is needed to carry out this regeneration.

To regenerate the filtering material, the unit comprises an air overpressure unit 8 for washing connected to a pipe 9 leading to the base of the filter.

In this manner, the washing air is sent into the filter bed 3 in counter-flow to the water to be treated. The washing waters are collected by a pipe 10.

Figure 2:
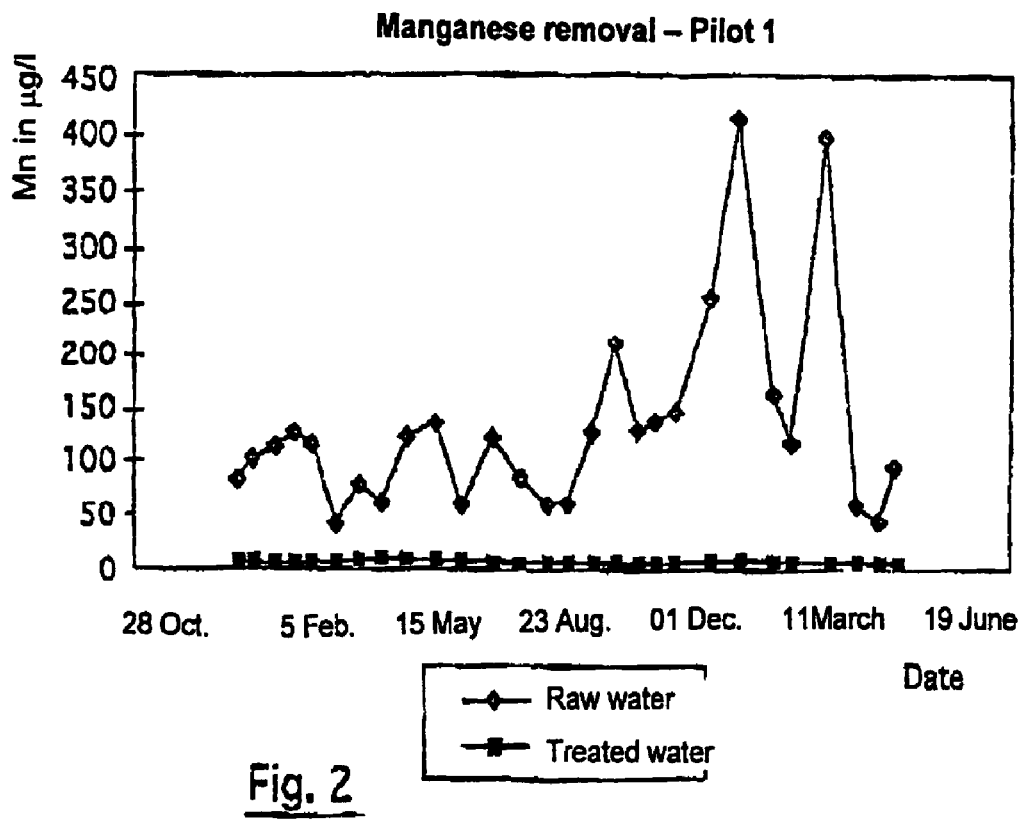
FIGS. 2 and 3 show manganese removal curves obtained with the method of the invention.

In FIG. 2, to illustrate the results obtained with the method of the invention applied to the unit shown in FIG. 1, the changes in the manganese content of untreated water and treated water are shown using a first pilot unit for demanganising surface water after a coagulation and flocculation step.

In this unit the contact time of the water with the filter bed is in the order of 3 minutes.

While the manganese content of the untreated water varies between 40 and 410 µg/l, the efficacy of the method can be ascertained with a residual content in the treated water that is constantly below 10 µg/l, i.e. removal reaching as high as 97.5%.

Figure 3:
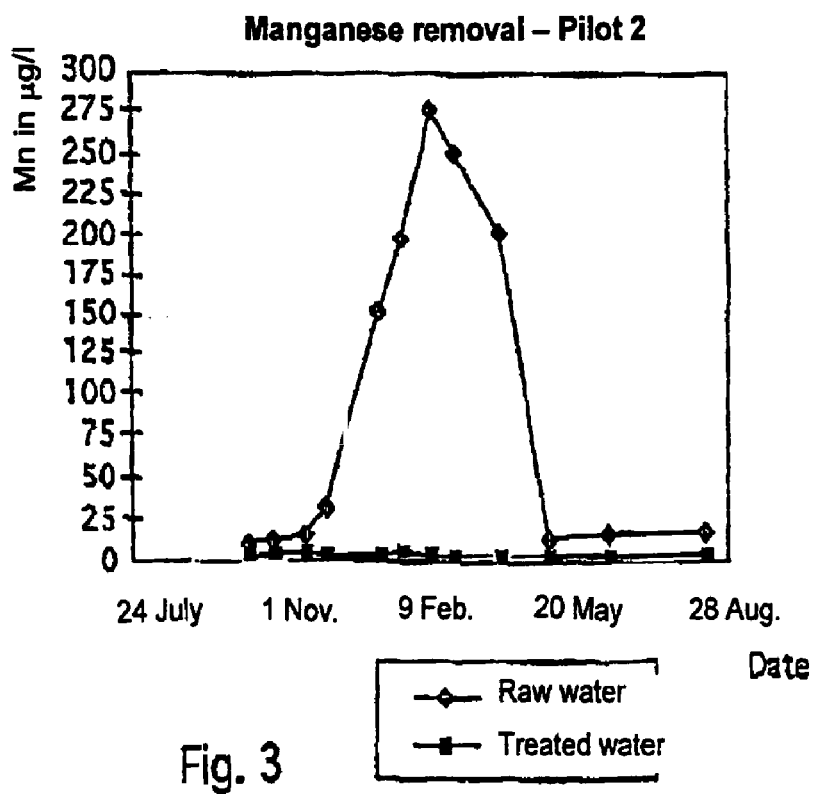

The second pilot unit was applied to dam water after an aeration step. In the curves shown in FIG. 3, it will be noted that for variations in manganese content ranging from 10 to 270 µg/l, the residual contents in the treated water is constantly below 7 µg/l.

With the method just described, it is therefore possible to reduce the manganese content of water to be treated, which is likely to show major seasonal variations.

The contact time of the water to be treated with the filtering material lies between 30 seconds and 10 minutes depending upon the desired percentage of reduction and the desired residual content.

With results that are at least equivalent and even superior to those achieved with techniques of the prior art, the method for using a specific filtering material avoids the recourse to oxidants both for the filtering step and for regeneration of the filter bed.

The invention claimed is:

1. A method for treating water to reduce the manganese and/or iron content of the water comprising: causing said water to transit through at least one bed of filtering material formed at least in part of grains of manganese dioxide, said grains having a specific gravity of between 3.5 and 4.5 and a hardness greater than 6 on the Mohs scale.

2. The method of claim 1 including, from time to time, mechanically regenerating said manganese dioxide.

3. The method of claim 2 wherein said regeneration step of said bed of filtering material is conducted periodically.

4. The method of claim 2 wherein said regeneration step is performed in response to said bed of filtering material reaching a predetermined load loss.

5. The method of claim 2 wherein said regeneration step is performed by washing the bed of filtering material with water.

6. The method of claim 2 wherein said regeneration step is performed by washing the bed of filtering material with a gaseous fluid.

7. The method of claim 6 wherein said regeneration step is performed by washing the bed of filtering material with air.

8. The method of claim 2 wherein said regeneration step is conducted by washing the bed of filtering material, and wherein the washing step is conducted in a counter flow direction to the direction of the flow of water to be treated within said bed of filtering material.

9. The method of claim 2 wherein said regeneration step is conducted by washing the bed of filtering material, and wherein the washing step is performed in the same direction as the flow of water to be treated within said bed of filtering material.

10. The method of claim 1 wherein said filter material contains at least 70% by weight of manganese dioxide.

11. The method of claim 1 wherein the grains of manganese dioxide have an effective size of approximately 0.8 to 1 mm and a uniformity coefficient of between 1.3 and 2.5.

12. The method of claim 1 wherein said grains of manganese dioxide are associated with at least one other material selected from the group including sand, anthracite, and active carbon granules.

13. The method of claim 1 including crushing and screening the manganese dioxide to obtain a particle size suitable for filtration.

14. The method of claim 1 including adjusting the pH of the water to be treated prior to directing the water through the bed of filtering material.

15. The method of claim 14 wherein the step of adjusting the pH of the water includes treating the water with air, sodium hydroxide, or lime water, upstream from the filtering step.

16. The method of claim 1 wherein the treatment of the water passing through the bed of filtering material is conducted under atmospheric pressure.

17. The method of claim 1 wherein the step of transmitting the water through the bed of filtering material is conducted under pressure.

18. The method of claim 1 wherein the residency time of the water within the bed of filtering material ranges from approximately 30 seconds to 10 minutes.

19. The method of claim 1 wherein the manganese dioxide acts as both a catalyst and an oxidant.

20. The method of claim 19 wherein the manganese dioxide absorbs manganese dissolved in the water and oxidizes the dissolved manganese in the water.

21. The method of claim 1 further including utilizing the manganese dioxide to oxidize arsenic and selenium.

22. The method of claim 1 wherein through oxidation of the dissolved manganese and through the reduction of the manganese dioxide, manganese sesquioxide is formed and gradually coats the grains of the manganese dioxide.

23. The method of claim 1 wherein the filtering material comprises the homogeneous grains of manganese dioxide and separate granules of sand.

24. The method of claim 23 wherein the filtering material comprises by volume approximately 70% grains of manganese dioxide and 30% granules of sand.

25. The method for treating water of claim 1 wherein the bed of filtering material is formed at least in part by naturally occurring manganese dioxide.

26. A method for treating water and reducing the manganese and/or iron content of the water, consisting essentially of: directing the water through a filter bed that initially includes grains of manganese dioxide where the grains have a specific gravity of between 3.5 and 4.5 and a hardness greater than 6 on the Mohs scale; and the manganese dioxide absorbing manganese dissolved in the water and oxidizing the dissolved manganese present in the water.

* * * * *